United States Patent Office 2,816,603
Patented Dec. 17, 1957

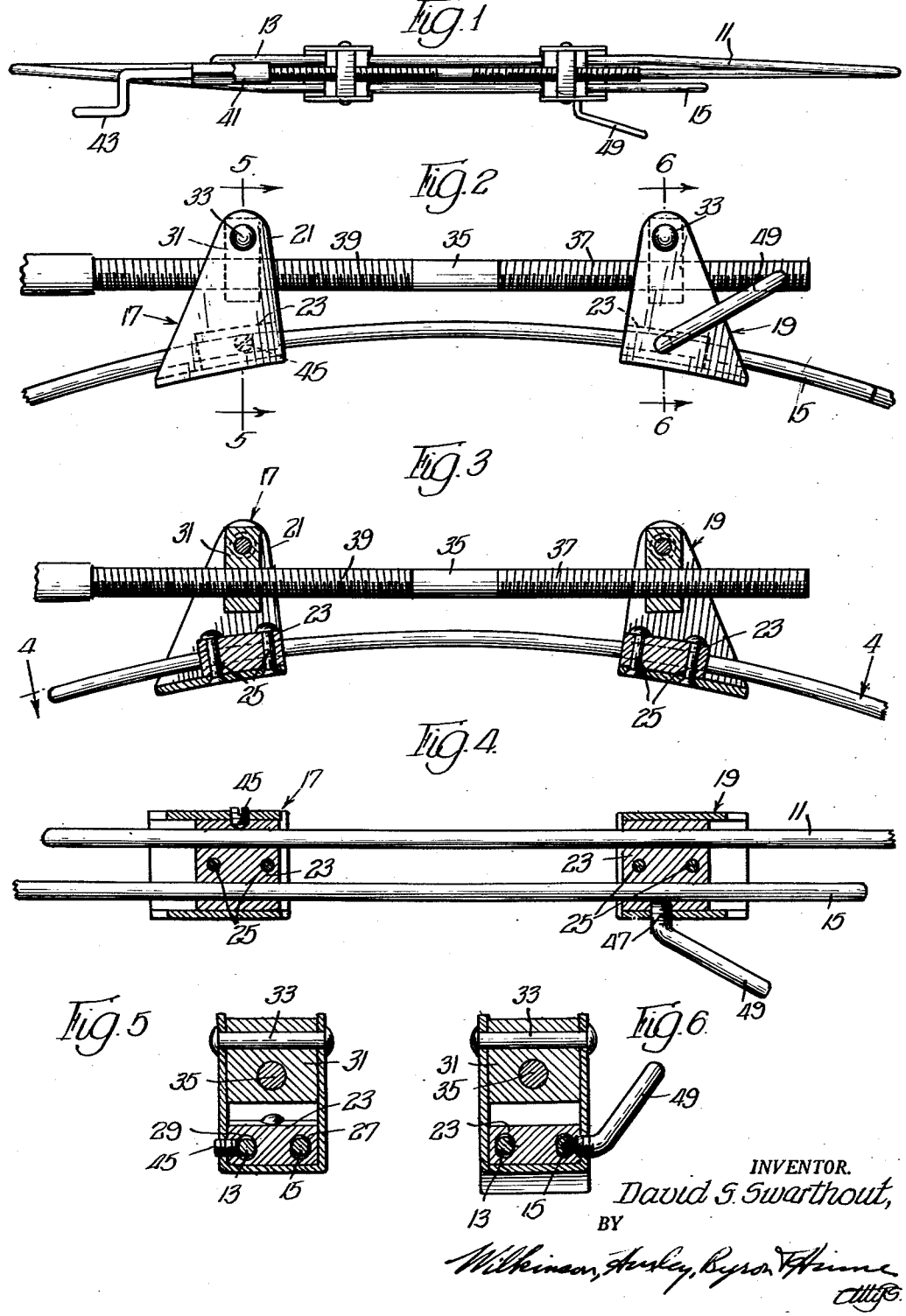

2,816,603

SCREW ACTUATED BEAD SEATING TOOL FOR TUBELESS TIRES

David S. Swarthout, Chicago, Ill.

Application January 4, 1955, Serial No. 479,793

2 Claims. (Cl. 157—1.21)

This invention relates to a new and improved tire tool and more particularly to a tool especially adapted for use with tubeless tires.

Tubeless tires are now in wide use and in contradistinction to the older tubeless tires which were complete tubes, the present tires comprise spaced beads and the rim between the beads serves to retain air in the tire. With such tires it is essential that the beads make and maintain airtight contact with the adjacent rim surfaces. For this purpose the beads are normally provided on their outer, generally vertical surfaces with circumferentially extending ridges of soft rubber or the like which are compressed against the inner lateral faces of the rim sides when the tire is inflated. These ridges must be held against the rim surfaces with substantial pressure before they provide an airtight seal.

It will be understood that the air inlet valve normally extends through the lower portion of the drop-center rims which are provided for mounting the tires. It is not possible to merely place the tire on the rim and start inflation as the tire does not make airtight contact with the rim. It is necessary therefore to provide mechanical means for forcing the tire beads outwardly against the rims with sufficient pressure to form an air tight seal before inflation can be begun. Once the internal air pressure has reached an amount adequate to force the bead ridge against the rim with sealing pressure, the mechanical means may be removed and the inflation can then continue until the desired working pressure is attained. It has been found with present types of tubeless tires that an internal pressure of approximately eight pounds per square inch is adequate to insure effective airtight sealing between the bead ridges and the rim.

It is an object of the present invention to provide a tire tool adapted to force the beads of tubeless tires with sealing pressure against rim side walls.

It is a further object to provide a tool of this character which operates by circumferential pressure on the outer face of the central tread portion of a tire sufficient to compress this portion of the tire inwardly in a radial direction.

It is also an object to provide a means to control such radial compression in order to force the tire beads and their sealing ridges in opposite axial directions so as to cause a sealing contact with inner rim faces.

It is an additional object to provide a tire tool of this character which is simple in design and operation and adapted for commercial production and use.

Other and further objects will appear as the description proceeds.

I have shown certain preferred embodiments of my invention in the accompanying drawings in which—

Figure 1 is a plan view of the actuating portion of the device;

Figure 2 is a side elevation, on an enlarged scale, of the actuating portion of the device;

Figure 3 is a longitudinal, vertical section of the construction of Figure 2;

Figure 4 is an arcuate longitudinal section taken on line 4—4 of Figure 3;

Figure 5 is a transverse section taken on line 5—5 of Figure 2; and

Figure 6 is a transverse section taken on line 6—6 of Figure 2.

The construction comprises the continuous band 11 which, as shown, is a metal rod of circular cross section and bent in the form of an approximate circle with its ends 13 and 15 overlapping. It will be understood that this band may take other forms and contours and may be flexible rather than semi-rigid. The means for tightening the band 11 about the circumference of the tire comprises a pair of spaced bracket assemblies 17 and 19. Each assembly comprises a generally U-shaped body member 21 and a guide portion 23 located between the arms of the body member. In the specific construction shown, this guide portion 23 is a separate block which is secured against the inner face of the cross portion of the U by rivets 25.

The guide portion blocks 23 are provided with spaced parallel passages 27 and 29 to permit passage of the parallel end portions 13 and 15 of the band 11. These passages are shown as oval in cross section to provide for easy passage of the somewhat arcuate end portions. Each U-shaped member 21 carries a thrust member 31 which is pivotally supported adjacent the upper ends of the legs of the U member by means of a cross pin 33. Each thrust member 31 is provided with a threaded opening to receive the ends of a bar 35. These end portions of bar 35 are reversely threaded as shown at 37 and 39. One end of bar 35 carries a sleeve 41 fixedly secured thereto. This sleeve 41 has an opening in its end to receive an operating handle 43 by means of which the bar 35 may be rotated.

As shown in Figure 4, the bracket assembly 17 carries a set screw 45 which may be tightened to positively secure the end 13 of the band 11 in place in the guide portion 23. The guide portion 23 of the bracket assembly 19 carries a clamping screw 47 having a handle 49 for manually clamping and unclamping the screw. This clamping screw 47 serves to positively clamp the end 15 of the band in fixed relation to the bracket assembly 19.

In the operation of the device, the clamping screw 47 is loosened and the band 11 expanded sufficiently so that it may be slipped around the circumference of the tire being worked upon. The band is seated on the tire and brought in contact with its surface. The band end 15 is then clamped to the bracket assembly 19 by means of the clamp screw 47, this being accomplished by manually rotating the handle 49. It will be understood that the end 13 of the band is normally permanently clamped on the bracket 17 by the set screw 45. The assembly may be placed on the tire with the bracket assemblies 17 and 19 closely adjacent the inner ends of the reversely threaded portions 37 and 39 of the bar 35.

After the clamping, the bar 35 is rotated by means of handle 43 in such direction as to force the bracket assemblies 17 and 19 apart. It will be apparent that this movement draws the ends 13 and 15 along parallel to the adjacent portions of the band and thus reduces the effective circumference of the band and contacts the tread of the tire. This forces the beads of the tire laterally into contact with the rim so that inflation of the tire may be initiated. When the pressure in the tire has reached the desired holding amount, the band is removed from the tire which then may be fully inflated. The band is quickly released by rotation of handle 49 which relieves the clamping action of screw 47 against the end 15 of the band.

While I have shown a preferred embodiment of my invention, this is to be understood to be illustrative only as it is capable of variation to meet differing conditions and requirements and I therefore contemplate such modifications as come within the spirit and scope of the appended claims.

I claim:

1. A tire tool comprising a band adapted to extend around the outer circumference of a tire, said band having overlapping ends, a pair of spaced tightening bracket assemblies, each bracket assembly having portions adapted to engage the outer circumference of the tire, guide portions above the tire engaging portions for receiving both of the adjacent overlapping end portions of the band, means for securing one bracket assembly relative to each end of the band, and adjustable means for separating the bracket assemblies to tighten the band, said adjustable means comprising a bar having reversely threaded ends and thrust members pivotally supported in the bracket assemblies, said thrust members each having a threaded opening formed therein to receive one end of the bar.

2. A tire tool comprising a band adapted to extend around the outer circumference of a tire, said band having overlapping ends, a pair of spaced tightening bracket assemblies, each assembly comprising a generally U-shaped body member, the base of the U being adapted to engage the outer circumference of the tire, a guide portion located inside the U-shaped body member, said guide portion having parallel passages to permit passage of both the overlapped ends of the band, adjustable means for securing one end of the band within the guide portion of one body member and the other end within the guide portion of the other body member, a bar having reversely threaded ends, and thrust members pivotally supported by the U-shaped body members, said thrust members having threaded openings therein to receive the ends of the bar whereby rotation of the bar serves to move the bracket assemblies relative to each other.

References Cited in the file of this patent

UNITED STATES PATENTS

| | | |
|---|---|---|
| 397,262 | Williams | Feb. 5, 1889 |
| 700,871 | Williams | May 27, 1902 |
| 745,358 | Lanpher | Dec. 1, 1903 |
| 1,966,580 | Bull | July 17, 1934 |